May 13, 1952 R. M. BRUNTON 2,596,368
DIFFERENTIAL PRESSURE RELIEF VALVE
Filed Sept. 24, 1949
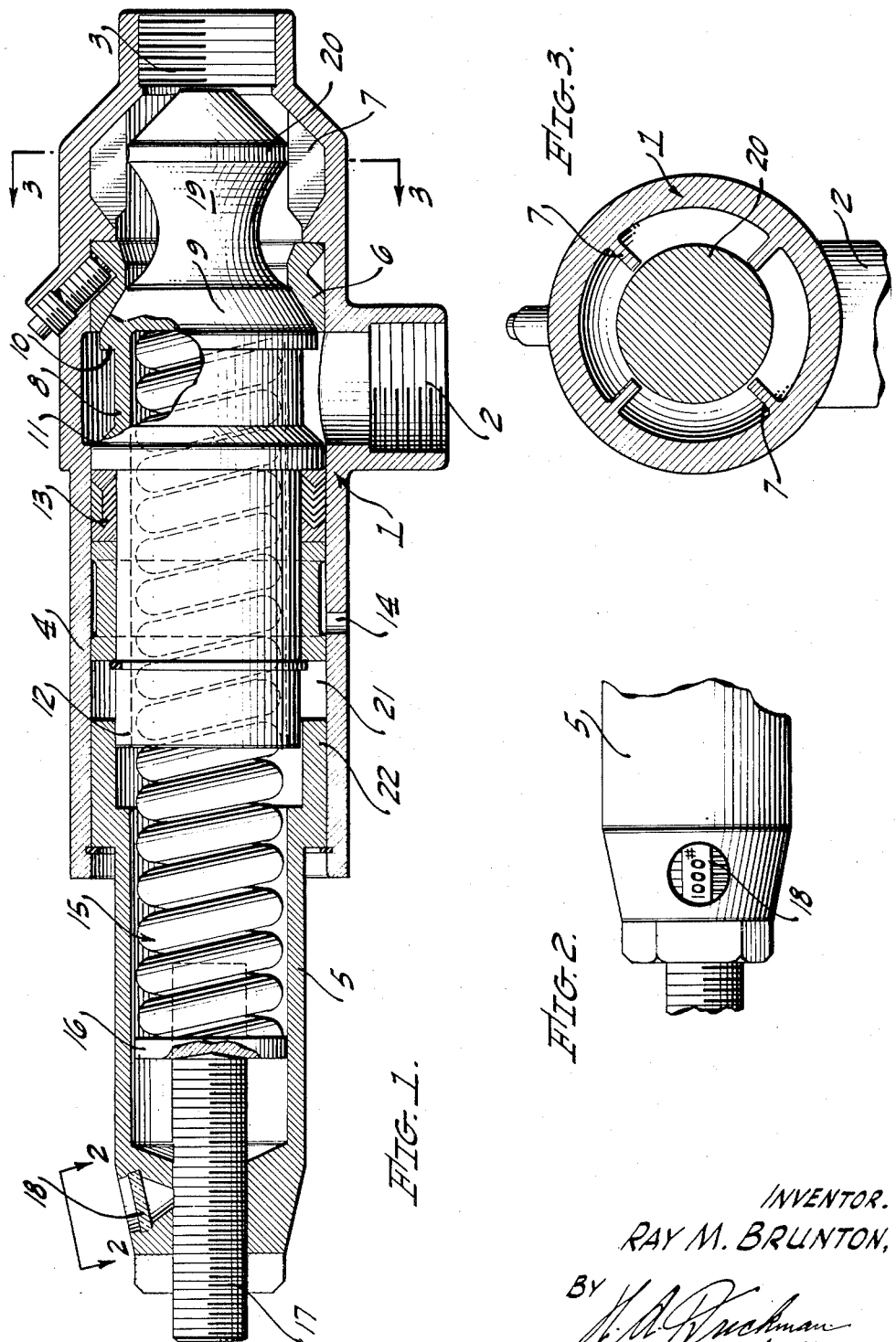
INVENTOR.
RAY M. BRUNTON,
BY
ATTORNEY.

Patented May 13, 1952

2,596,368

UNITED STATES PATENT OFFICE 2,596,368

DIFFERENTIAL PRESSURE RELIEF VALVE

Ray M. Brunton, Long Beach, Calif.

Application September 24, 1949, Serial No. 117,695

2 Claims. (Cl. 137—53)

1

This invention relates to a differential pressure relief valve for use in connection with fluid pumps, pipe lines, and the like, and in which the valve is opened to relieve excess pressure by a pressure differential on the valve structure.

An object of my invention is to provide a novel differential pressure relief valve of the character stated, in which a piston valve is opened by the pressure on the outlet side of a pump, or the like, this piston valve being open against the pressure of a spring and is further urged closed by the Venturi construction of the valve itself.

A feature of my invention is to provide a valve of the character stated, which will close more definitely, eliminating the so-called wire drawing of fluid, this closing being accomplished by the pressure generated in a Venturi shaped nozzle.

Other objects, advantages and feature of invention may appear from the accompanying drawing, the subjoined detailed description and the appended claims.

In the drawing:

Figure 1 is a longitudinal sectional view of my differential pressure relief valve.

Figure 2 is a fragmentary top view, as viewed from line 2—2 of Figure 1.

Figure 3 is a transverse sectional view taken on line 3—3 of Figure 1.

Referring more particularly to the drawing, my differential pressure relief valve comprises a body 1, which includes an intake port 2 and an outlet port 3. The intake port 2 extends into the side of the body 1, while the outlet port 3 is in axial alignment with the body.

The body 1 includes a cylinder portion 4, which extends horizontally from the body. A tubular extension 5 projects from the cylinder 4, substantially as shown, and is here shown as being a separate part although the parts 4 and 5 may be integral. A seat 6 is positioned in the body 1 inwardly of the outlet 3 and between this outlet and the intake tube. A plurality of guide wings 7 project inwardly from the body 1 and these guide wings are positioned forwardly of the seat 6. A valve 8 is formed with a seating surface 9, which rests on the seat 6 when the valve is closed. A pair of spaced shoulders 10—11 are formed on the valve 8, the shoulder 11 being greater in area than the shoulder 10, so that pressure at the intake 2 will tend to urge the valve to the left, as shown in Figure 1.

A sleeve 12 projects from the valve body 8 and extends into the cylinder 4. Suitable packing 13 is provided on the sleeve 12 and packs the area between the sleeve and the cylinder 4. Vent

2 holes 14 in the cylinder permit any fluid to drain out of this cylinder, which might by-pass the packing 13. A spring 15 fits within the sleeve 12 and seats on a head 16 of the screw 17. The screw 17 threads into the outer end of the tube 5 and thus the spring 15 will press against the valve 8 and urge this valve on to the seat 6.

A window 18 in the tube 5 enables the operator to observe the screw 17 and this screw is calibrated to indicate the tension on the spring 15, thus permitting the operator to accurately tension this spring, as desired.

The outer end of the valve 8 is formed with a venturi shape 19. This curve or venturi area terminating in a ring 20. The purpose of this construction is to assist in the closing of the valve, this is, assist the spring 15 in pulling the surface 9 against its seat. This is accomplished because fluid flowing over a Venturi nozzle will build up pressure, and this pressure acting against the ring 20, will tend to push the valve on to its seat.

In many relief valves it is difficult to entirely seat the valve due to the fact that when a very small space exists between the valve and its seat, the fluid passes through this space at very high velocity, which is known as wire drawing, and this high velocity fluid prevents the valve from entirely seating. With my venturi shape of the valve, I provide additional pressure tending to close the valve and the valve will positively close, as required.

An air bumper space 21 is provided between the inner end of the packing assembly 13 and a shoulder 22 in the cylinder 4. This bumper area cushions the movement of the valve towards its open position.

Operation

In operation my differential pressure relief valve is connected to the outlet side of a pump or to a pipe line, by means of a fitting threaded into the intake tube. Whenever the pressure at 2 becomes high enough, the pressure against the shoulder 11 will push the valve open against the tension of the spring 15. Fluid then pours out of the outlet 3 until the pressure at 2 is reduced. At that time, the tension of the spring 15, plus the Venturi pressure at 19 against the ring 20, will seat the valve and again prevent fluid from by-passing out of the valve.

Having described my invention, I claim:

1. A differential pressure relief valve comprising a body, said body having an intake port, an outlet port, and a cylinder section, said cylinder being in alignment with the outlet port, a valve seated in the body between the intake and outlet ports, a sleeve projecting from the valve into the cylinder, packing surrounding the sleeve and bearing against the cylinder, a spring in the cylinder bearing against the valve and urging the valve towards closed position, said cylinder having vent ports therein adjacent the packing to relieve fluid back of said packing, a Venturi section projecting from the valve towards the outlet port, and a ring at the outer end of said Venturi section, guide wings on the body projecting inwardly therefrom, said ring sliding on the wings.

2. A differential pressure relief valve comprising a body, said body having an intake port, an outlet port, and a cylinder section, said cylinder being in alignment with the outlet port, a valve seat in the body between the intake and outlet ports, a valve resting on said seat, a spring in the cylinder bearing against the valve and urging the valve against said seat, said valve including an integral Venturi section projecting from the valve towards the outlet port, a flat ring area on the outer end of said Venturi section, a plurality of guide wings on the body projecting inwardly therefrom, said flat ring bearing against said wings, a sleeve projecting from the valve into the cylinder, a packing in the cylinder surrounding the sleeve and bearing against the cylinder, said cylinder having vent ports therein adjacent the packing to relieve fluid back of said packing.

RAY M. BRUNTON.

REFERENCES CITED

The following references are of record in the file of this patent:

UNITED STATES PATENTS

| Number | Name | Date |
| --- | --- | --- |
| 126,982 | Pallett | May 21, 1872 |
| 427,264 | Iwanowitsch | May 6, 1890 |
| 770,824 | Schreidt | Sept. 27, 1904 |
| 1,159,518 | Maul | Nov. 9, 1915 |
| 1,221,719 | Fritch | Apr. 3, 1917 |
| 1,865,560 | Duffield | July 5, 1932 |
| 2,338,820 | Bornell | Nov. 13, 1945 |

FOREIGN PATENTS

| Number | Country | Date |
| --- | --- | --- |
| 677,763 | Germany | July 3, 1939 |